Inventor:
Reinhard Hofmann

Patented Feb. 25, 1930

1,748,768

UNITED STATES PATENT OFFICE

REINHARD HOFMANN, OF VEVEY, SWITZERLAND, ASSIGNOR TO ALLIS-CHALMERS MANUFACTURING COMPANY, OF MILWAUKEE, WISCONSIN, A CORPORATION OF DELAWARE

WATER TURBINE WITH A HIGH SPECIFIC SPEED

Application filed August 29, 1921, Serial No. 496,578, and in Switzerland June 2, 1915.

(GRANTED UNDER THE PROVISIONS OF THE ACT OF MARCH 3, 1921, 41 STAT. L., 1313)

Applications for Letters Patent have been filed in Switzerland June 2, 1915, and in Germany July 26, 1915.

The object of the present invention is a water-turbine of the axial-type with a specific speed of at least 330. The specific speed or specific number of revolutions of a turbine runner is calculated from the formula:

$$n_s = \frac{n\sqrt{N}}{H\sqrt[4]{H}}$$

In this formula $n_s$ is the specific number of revolutions, $n$ is the number of revolutions per minute of the turbine runner designed to work under a given head $H$ and to deal with a given quantity of water, $N$ is the output developed by the turbine runner in brake horse powers for said head and said quantity of water and $H$ is the head in meters.

The hitherto known axial turbines (Jonval-turbines) have only been designed for lower specific speeds (below 200) and have been found unserviceable for modern plants and surpassed by the turbines of the Francis type. The Francis turbines with a high specific speed dealing with relatively large quantities of water and in which the entrance of the water takes place in the radial direction and the discharge of the water in the axial direction present the following disadvantages:

1. In consequence of the deviation of the water from the radial into the axial direction friction losses and impact or eddy losses occur.

2. The great circumferential velocity over the whole vane edge of the runner causes a high relative velocity of the water along the runner blades and therefore considerable friction losses.

3. The arrangement for the supply of the water requires much space, causes impact losses and further causes turbines with horizontal shafts to be placed at a low elevation below the water level of the head water.

According to the present invention the principle of the radial entrance of the water which has been used with all the hitherto known turbines with a high specific speed is departed from in appreciating the advantages of the axial flow for turbines with a high specific speed, whereby the afore-mentioned disadvantages are for the most part overcome. The diameter of the turbine according to the invention is much smaller than that of the known turbines with a high specific speed and of the same output whereby the costs of the turbine are much reduced and moreover a considerable simplification of the whole turbine plant results.

In order to attain good reaction ratios in spite of the great difference in the circumferential velocities in the runner at least one intermediate concentric ring shaped wall may be provided in front of the guide wheel. The turbine may further be arranged outside the forebay which arrangement has only been possible with the hitherto known turbines with a high specific speed and a radial entrance of the water by providing a special casing surrounding the turbine.

Three constructional examples of the turbine according to the invention are illustrated on the accompanying drawing in which.

With all the exemplifications shown the water flows from the forebay $i$ into the inlet funnel $a$ from where it passes in an axial direction through the guide wheel $b$ and through the runner $c$ and is led off by the draft tube or suction pipe $d$ without any abrupt change of direction of flow being caused. With the constructional example illustrated in Fig. 1 the inlet funnel $a$ is arranged in the side wall of the open water basin or forebay $i$ and projects beyond said wall, so that the turbine located within said funnel is outside the forebay $i$. In order to attain a good reaction ratio between guide wheel and runner and to avoid losses resulting from eddies, an intermediate ring shaped wall $e$ is provided in front of the guide wheel $b$ and coaxial with the latter. This arrangement of the turbine outside the forebay makes the turbine conveniently accessible.

The runner $c$ is fixed on the horizontal shaft $k$, which is mounted at its front end in a bearing $l$ carried by a spider $m$ integral with the inlet funnel $a$. The vanes of the guide wheel $b$ are mounted on turntable rods or pivots $n$ arranged in a plane at right angles to the shaft $k$. Each rod $n$ is provided with a lever $o$ and by turning the levers $o$ the vanes of the guide wheel $b$ can be turned into any position from the open to the closed position.

Figure 1:
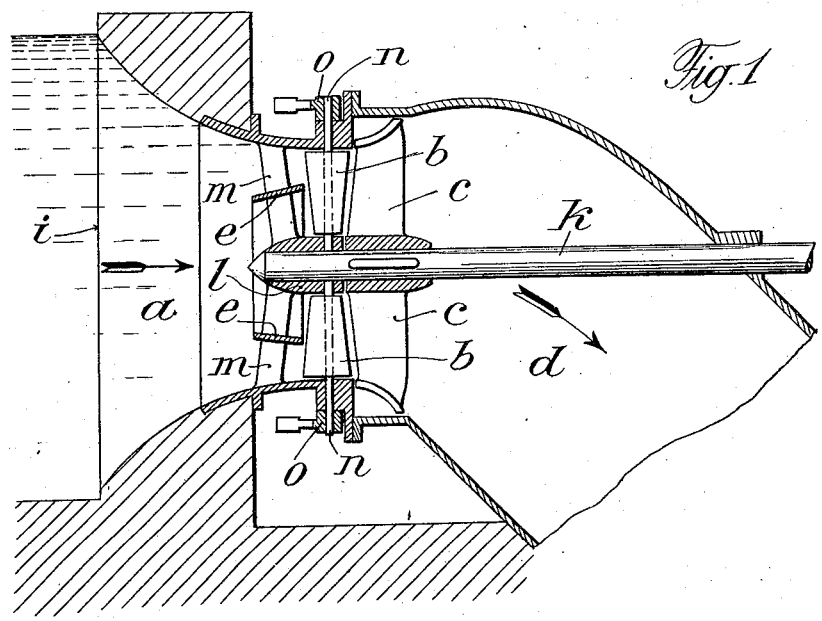
Fig. 1 is a vertical section through a turbine provided with a horizontal shaft, the turbine being arranged outside the forebay.
Figure 3:
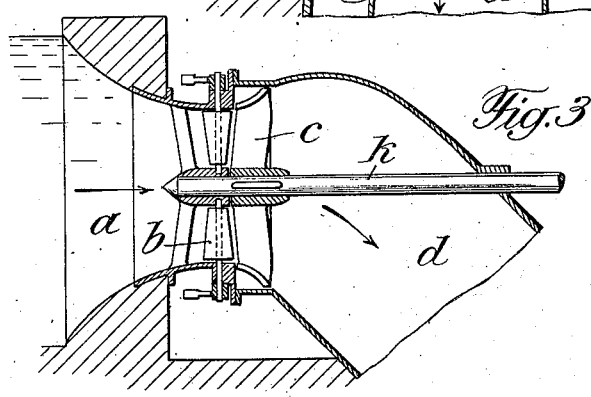
Fig. 3 shows a turbine corresponding to that shown in Fig. 1 with the exception of a slight modification.

The turbine illustrated in Fig. 3 differs from that shown in Fig. 1 inasmuch as no ring shaped wall $e$ is provided.

Figure 2:
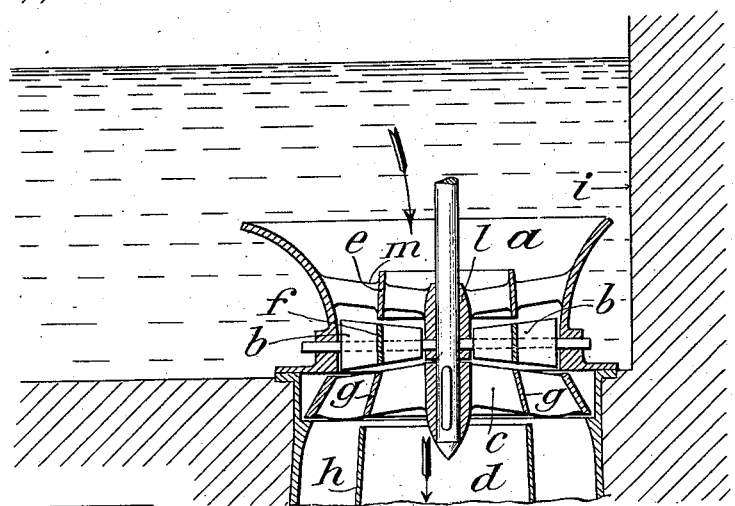
Fig. 2 shows in a vertical section a turbine provided with a vertical shaft and arranged inside the forebay.

In the constructional example illustrated in Fig. 2 the turbine is located in the lower portion of the forebay $i$ and the entrance funnel $a$ projects into the forebay $i$. For the purpose of providing desirable guidance of the water, intermediate ring shaped walls $f$, $g$ and $h$ are provided in the guide wheel $b$, in the runner $c$ and the suction pipe $d$ respectively whereby eddy-losses are very much reduced.

I claim:

1. In a hydraulic turbine, an axial flow rotor formed to produce high specific speed, means forming a conduit for delivering fluid to said rotor axially thereof, means for producing variable whirling motion of water advancing axially through said conduit, and flow decelerating means communicating with the discharge side of said rotor.

2. In a hydraulic turbine, an axial flow rotor formed to produce a specific speed of at least 330, means forming a conduit for delivering fluid to said rotor axially thereof, means in said conduit for producing variable whirling motion of water advancing axially through said conduit, and a flow decelerator communicating with the discharge side of said rotor.

3. In a hydraulic turbine, an axial flow rotor formed to produce high specific speed, means forming a purely axial flow conduit communicating with the inlet side of said rotor, means for producing variable whirling motion of water flowing through said conduit, and a flow decelerator communicating with the discharge side of said rotor.

4. In a hydraulic turbine, an axial flow rotor formed to produce high specific speed, means forming an axial flow conduit communicating with the inlet side of said rotor, means located in said conduit for producing variable whirling motion of water flowing through said conduit, and a flow decelerator communicating with the discharge side of said rotor.

5. In a hydraulic turbine, an axial flow rotor formed to produce a specific speed of at least 330, means forming a purely axial flow conduit communicating with the inlet side of said rotor, adjustable means for producing variable whirling motion of water flowing through said conduit, and a flow decelerator communicating with the discharge side of said rotor.

6. In a hydraulic turbine, an axial flow rotor formed to produce a specific speed of at least 330, means forming an axial flow conduit communicating with the inlet side of said rotor, adjustable means located in said conduit for producing variable whirling motion of water flowing through said conduit, and a flow decelerator communicating with the discharge side of said rotor.

7. In a hydraulic turbine, an axial flow rotor formed to produce a specific speed of at least 330, means forming an axial flow conduit communicating with the inlet side of said rotor, pivotally supported guide vanes for delivering water to said conduit from vane edges extending longitudinally of the pivotal axes, and flow decelerating means communicating with the discharge side of said rotor.

8. In a hydraulic turbine, a rotor comprising vanes all portions of the inlet edges of which extend transversely of the rotor axis, said rotor being formed to produce a specific speed of at least 330, an axial flow guide casing, pivotally supported guide vanes in said casing formed to deliver water axially of said rotor and toward said inlet vane edges, and a draft tube for guiding and decelerating the flow of water discharged from said rotor.

9. In a hydraulic turbine, an axial flow rotor formed to produce a specific speed of at least 330, means forming a purely axial flow conduit communicating with the inlet side of said rotor, adjustable means for producing whirling motion of water flowing through said conduit, and a flow decelerator communicating with the discharge side of said rotor and having a central axis inclined at an acute angle relatively to the rotor axis whereby abrupt changes in direction of flow are prevented.

10. In a hydraulic turbine, an axial flow rotor formed to produce a specific speed of at least 330, means forming an axial flow conduit communicating with the inlet side of said rotor, adjustable means located in said conduit for producing whirling motion of water flowing through said conduit, and a flow decelerator communicating with the discharge side of said rotor and having a central axis inclined at an acute angle relatively to the rotor axis whereby abrupt changes in direction of flow are prevented.

In testimony whereof I have signed my name to this specification.

REINHARD HOFMANN.